United States Patent
Fan

(10) Patent No.: US 9,351,022 B2
(45) Date of Patent: May 24, 2016

(54) REALIZATION METHOD, DEVICE, AND SYSTEM FOR BROADCAST SERVICE GROUPING

(75) Inventor: Yunsong Fan, Chengdu (CN)

(73) Assignee: Huawei Technologies Co., Ltd., Shenzhen (CN)

(*) Notice: Subject to any disclaimer, the term of this patent is extended or adjusted under 35 U.S.C. 154(b) by 526 days.

(21) Appl. No.: 13/425,917

(22) Filed: Mar. 21, 2012

(65) Prior Publication Data

US 2012/0180102 A1    Jul. 12, 2012

Related U.S. Application Data

(63) Continuation of application No. PCT/CN2009/074131, filed on Sep. 23, 2009.

(51) Int. Cl.
| | |
|---|---|
| *H04N 21/2362* | (2011.01) |
| *H04N 21/434* | (2011.01) |
| *H04N 21/435* | (2011.01) |
| *H04N 21/235* | (2011.01) |
| *H04N 21/266* | (2011.01) |
| *H04N 21/2665* | (2011.01) |

(52) U.S. Cl.
CPC ......... *H04N 21/2362* (2013.01); *H04N 21/235* (2013.01); *H04N 21/266* (2013.01); *H04N 21/2665* (2013.01); *H04N 21/435* (2013.01); *H04N 21/4345* (2013.01)

(58) Field of Classification Search
CPC .............. H04N 21/435; H04N 21/235; H04N 2/43451; H04N 21/4345; H04N 21/2362
See application file for complete search history.

(56) References Cited

U.S. PATENT DOCUMENTS

| | | | | |
|---|---|---|---|---|
| 8,484,299 | B2 * | 7/2013 | Mizosoe et al. | 709/206 |
| 2001/0014976 | A1 * | 8/2001 | Roop et al. | 725/91 |
| 2002/0073229 | A1 * | 6/2002 | Hayashi | 709/237 |
| 2002/0118608 | A1 * | 8/2002 | Oishi | H04H 20/06 369/1 |
| 2002/0172198 | A1 * | 11/2002 | Kovacevic | 370/389 |
| 2004/0143785 | A1 | 7/2004 | Lee | |

(Continued)

FOREIGN PATENT DOCUMENTS

| | | |
|---|---|---|
| CN | 1770838 A | 5/2006 |
| CN | 101449576 A | 6/2009 |
| WO | WO 2007/136201 A1 | 11/2007 |
| WO | WO 2011/035468 A1 | 3/2011 |

OTHER PUBLICATIONS

Search Report issued in corresponding Chinese Patent Application No. 2009801066569, dated Jul. 26, 2013, 2 pages.

(Continued)

*Primary Examiner* — Ricky Chin
(74) *Attorney, Agent, or Firm* — Brinks Gilson & Lione

(57) ABSTRACT

A method, device and system for broadcast service grouping are provided. The method includes: receiving, by a terminal, at least one virtual channel table delivered by a network side, where the virtual channel table includes a first checksum and a data object that are generated by the network side, and the data object includes channel information; using a preset broadcast service group identifier and the data object of the virtual channel table to acquire a second checksum of the preset broadcast service group identifier and the data object of the virtual channel table; and acquiring a virtual channel table that passes check from the at least one virtual channel table delivered by the network side, when the first checksum matches the second checksum.

19 Claims, 8 Drawing Sheets

(56) References Cited

U.S. PATENT DOCUMENTS

| | | | |
|---|---|---|---|
| 2005/0166241 A1* | 7/2005 | Kim | H04N 5/44513 |
| | | | 725/81 |
| 2006/0053446 A1* | 3/2006 | Kim et al. | 725/39 |
| 2006/0064629 A1* | 3/2006 | Lee | 714/798 |
| 2007/0036166 A1* | 2/2007 | De Marchi et al. | 370/402 |
| 2009/0138918 A1 | 5/2009 | Bae | |
| 2010/0162307 A1* | 6/2010 | Suh et al. | 725/39 |
| 2012/0041931 A1* | 2/2012 | Ross | 707/693 |

OTHER PUBLICATIONS

International Search Report issued in corresponding PCT Patent Application No. PCT/CN2009/074131, mailed Jul. 1, 2010.
Extended European Search Report issued in corresponding European Patent Application No. 09849656.5, mailed May 14, 2012.
Written Opinion of the International Searching Authority issued in corresponding PCT Patent Application No. PCT/CN2009/074131, mailed Jul. 1, 2010.

* cited by examiner

REALIZATION METHOD, DEVICE, AND SYSTEM FOR BROADCAST SERVICE GROUPING

CROSS-REFERENCE TO RELATED APPLICATIONS

This application is a continuation of International Application No. PCT/CN2009/074131, filed on Sep. 23, 2009, which is hereby incorporated by reference in its entirety.

FIELD

The present disclosure relates to the field of network technologies, and in particular, to a method, device and system for broadcast service grouping.

BACKGROUND

Out of a need of Cable TV system digitalization conversion, a cable TV Cable operator in North America releases a simple set top box terminal product in a type of digital TV adapter (Digital TV Adapter, DTA), which is used to realize receiving and converting of a digital TV signal. Generally, a simple set top box product of this type has a relatively simple management manner of system control and a neat control system solution, provides an economical solution for a low-end subscriber without the necessity of a complex broadcast service, and reduces a deployment cost.

Because the system has a simple structure, and performing individual authorization management of broadcast services according to groups on each subscriber is not taken into account, the system is only capable of providing a simple service for the subscriber, and cannot realize authorization of the broadcast services according to groups. However, in a practical application, even for low-end subscribers, a difference between broadcast service demands also exists to a certain extent, and when the low-end subscriber wants to select a broadcast service, this control system that is incapable of grouping the broadcast services provided to the subscribers cannot satisfy the broadcast service grouping demand of the subscriber.

SUMMARY

Embodiments of the present disclosure provide a realization method and device for broadcast service grouping, so as to solve a problem that a control system of a simple set top box product based on a DTA type cannot group broadcast services in the prior art.

A first embodiment of the present disclosure provides a method for acquiring a virtual channel table, VCT, including: receiving at least one virtual channel table delivered by a network side, where the virtual channel table includes a first checksum and a data object that are generated by the network side, and the data object includes channel information; using a preset broadcast service group identifier and the data object of the virtual channel table to acquire a second checksum of the preset broadcast service group identifier and the data object of the virtual channel table; and acquiring a virtual channel table that passes the check from the at least one virtual channel table delivered by the network side, when the first checksum matches the second checksum.

An embodiment of the present disclosure provides a method for broadcast service grouping, including: for broadcast channel information of different groups, using a corresponding broadcast service group identifier and a virtual channel table to acquire a first checksum of the corresponding broadcast service group identifier and the virtual channel table; and delivering the virtual channel table including the first checksum and a data object to a terminal, where the data object includes channel information.

An embodiment of the present disclosure provides a device for acquiring a virtual channel table, including: a receiving module, configured to receive at least one virtual channel table delivered by a network side, where the at least one virtual channel table includes a first checksum generated by the network side; a first check module, configured to use a preset broadcast service group identifier and a data object of the virtual channel table to acquire a second checksum of the preset broadcast service group identifier and the data object of the virtual channel table, where the data object includes channel information; and an acquiring module, configured to acquire a virtual channel table that passes the check from the at least one virtual channel table delivered by the network side, when the first checksum matches the second checksum.

An embodiment of the present disclosure provides a device for broadcast service grouping, including: a second check module, configured to use a corresponding broadcast service group identifier and a virtual channel table to acquire a first checksum of the corresponding broadcast service group identifier and the virtual channel table, for broadcast channel information of different groups; and a sending module, configured to deliver the virtual channel table including the first checksum and a data object to a terminal, where the data object includes channel information.

An embodiment of the present disclosure provides a system for broadcast service grouping, including: a network side equipment, configured to use a corresponding broadcast service group identifier and a virtual channel table to acquire a first checksum of the corresponding broadcast service group identifier and the virtual channel table, for broadcast channel information of different groups; and deliver the virtual channel table including the first checksum to a terminal. The terminal is configured to receive a virtual channel table delivered by a network side, where the virtual channel table includes a first checksum generated by the network side; use a preset broadcast service group identifier and a data object of the virtual channel table to acquire a second checksum of the preset broadcast service group identifier and the data object of the virtual channel table; and acquire a virtual channel table that passes the check from the at least one virtual channel table delivered by the network side, when the first checksum matches the second checksum, where the data object includes channel information.

In the embodiments of the present disclosure, authorization of services according to levels and groups may be realized based on a simplified control system, an already deployed terminal is limited to being only capable of receiving basic programs in a case that software is not upgraded, while a subsequently released terminal may receive channel information of a service group to which the subsequently released terminal belongs. The subsequently released terminal is a terminal capable of checking and calculating a checksum according to the present disclosure. According to the embodiments of the present disclosure, authorized receiving of services according to groups and levels can be realized on a terminal side under existing network conditions without the necessity of adopting CA (conditional access).

BRIEF DESCRIPTION OF THE DRAWINGS

To illustrate the embodiments of the present disclosure or in the prior art more clearly, the accompanying drawings for describing the embodiments or the prior art are introduced briefly in the following. Apparently, the accompanying drawings in the following description are only some embodiments of the present disclosure, and persons of ordinary skill in the art can derive other drawings from the accompanying drawings without creative efforts.

DETAILED DESCRIPTION OF THE EMBODIMENTS

The solutions in the present disclosure will be clearly and completely described in the following with reference to the accompanying drawings. It is obvious that the embodiments to be described are only a part rather than all of the embodiments of the present disclosure. All other embodiments obtained by persons of ordinary skill in the art based on the embodiments of the present disclosure without creative efforts shall fall within the protection scope of the present disclosure.

In order to make the aforementioned objectives, characteristics, and advantages of embodiments of the present disclosure more comprehensible, the embodiments of the present disclosure are illustrated in further detail below with reference to the accompanying drawings and specific implementation manners.

In a unidirectional network, after a terminal is powered on, and if the terminal is used for the first time, in this case, the terminal is not activated, cannot enter a normal service working state, and is required to wait for the network side (that is, network side equipment) to send a valid addressing unicast message for configuration. At the moment, a subscriber is required to report an equipment identifier of the terminal, for example, a physical identifier, that is, a unique identifier of an internal hardware module of the terminal, to the network side in an out-of-band manner (that is, by other communication means rather than through a service channel). After receiving the physical identifier reported by the subscriber, the network side equipment delivers the addressing unicast message through a broadcast channel. An addressing unicast address is uniquely determined by the equipment identifier of the terminal, and the addressing unicast message includes an area identifier and a service group identifier. After receiving the addressing unicast message of the terminal, the terminal firstly saves configuration information of the area identifier, and also saves configuration information of the service group identifier at the same time. After completing configuration of the area identifier, the terminal then waits for a valid activation message delivered by the network side, and the activation message carries the area identifier. Only after an area in which the terminal is located is activated by a network side headend, can the terminal normally enter the service working state.

Figure 1:
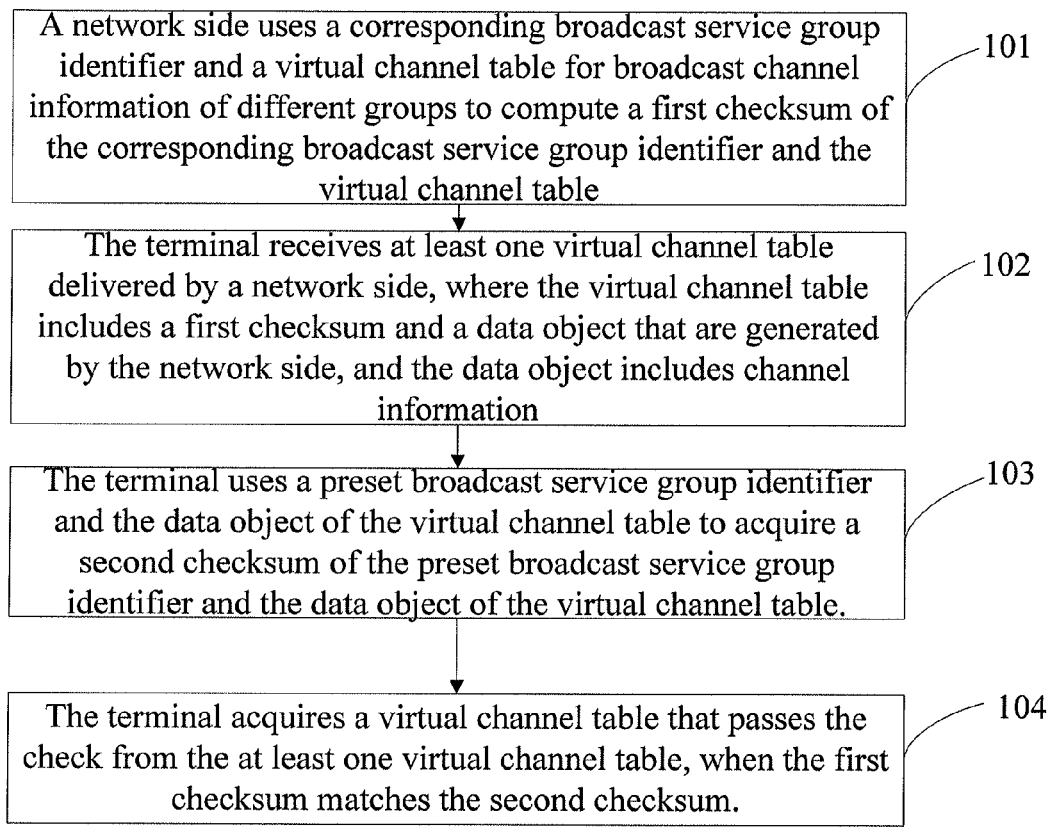
FIG. 1 is a flow chart of a first embodiment of a realization method for acquiring a virtual channel table according to the present disclosure.

Referring to FIG. 1, in a first embodiment of the present disclosure, a method provided in the first embodiment of the present disclosure may include the following steps.

In step 101, for broadcast channel information of different groups, a network side uses a corresponding broadcast service group identifier and a VCT to compute a first checksum of the corresponding broadcast service group identifier and the VCT.

The broadcast channel information of different groups includes basic channel information and extended channel information. Not all subscribers can acquire the extended channel information, and an extended virtual channel table, VCT (Virtual Channel Table), is defined on the network side. The extended VCT includes a broadcast channel number, a broadcast channel name, a broadcast frequency point and a modulation method. A service group identifier is required to be introduced into each set of CRC operation methods corresponding to the VCT, so the corresponding broadcast service group identifier and the virtual channel table, VCT, are used as source data on the network side, and the first checksum of the corresponding broadcast service group identifier and the VCT is computed. A data format of the extended VCT is similar to a data format of a basic VCT except that relevant parameters of a channel mapping table of the extended VCT are set to be seen only by a corresponding subscriber. When the first checksum is computed, the first checksum may be acquired by using the cyclic redundancy check (Cyclic Redundancy Check, CRC) methods or using other methods.

It should be noted that, for common channel information that can be acquired by all terminal subscribers and is thereby defined as the basic VCT, the corresponding method for acquiring the checksum on the network side remains unchanged, and the service group identifier is not introduced. Meanwhile, the terminal in this embodiment is a subsequently released terminal, which may be understood as an upgraded terminal and support relevant processing of the service group identifier, while a historical terminal is a terminal that is already deployed in a network but does not support the computation method of the service group identifier. Since the historical terminal does not support the processing of the service group identifier, when the checksum is acquired, for the extended VCT corresponding to an extended channel table, a result acquired from computation by the historical terminal is always wrong. Therefore, terminals mentioned in this application are all subsequently released terminals, that is, the terminals capable of supporting the relevant processing of the service group identifier. The computation method of the checksum may include cyclic redundancy check, CRC, Hash operation, block encryption operation, stream encryption operation, and exclusive-OR operation. The stream encryption uses an algorithm and a key to generate one random code stream, and then performs the exclusive-OR (XOR) operation on a data stream and the random code stream to generate an encrypted data stream.

In step 102, the terminal receives at least one virtual channel table delivered by the network side. The virtual channel table delivered by the network side includes the first checksum and a data object that are generated by the network side, and the data object includes channel information.

The network side sends the VCT including the first checksum and the data object to the terminal. The virtual channel table, VCT, includes the first checksum of the network side; the data object includes channel information that the terminal may receive, and the data object is provided in the form of a data structure in the VCT.

In step 103, the terminal uses a preset broadcast service group identifier and the data object of the virtual channel table as source data to acquire a second checksum of the preset broadcast service group identifier and the data object of the VCT.

The terminal uses both the broadcast service group identifier saved by the terminal and the data object of the received VCT as the source data, and computes the second checksum of the broadcast service group identifier and the data object of the received VCT. It is should be noted that, the method for the terminal acquiring the second checksum must be the same as the method for the network side acquiring the first checksum. The terminal in this embodiment is the subsequently released terminal, and the preset broadcast service group identifier thereof is already saved in the terminal. The data object of the virtual channel table is the data in the VCT except the first checksum.

In step 104, the terminal acquires a virtual channel table that passes the check from the at least one virtual channel table, when the first checksum matches the second checksum.

Then, the terminal matches the first checksum computed by the terminal with the second checksum, and when the first checksum and the second checksum match, the terminal acquires a corresponding VCT that passes the check from a plurality of VCTs delivered by the network side. Broadcast channel information included by the corresponding VCT is complete channel information of the terminal. The VCT that passes the check is equivalent to an extended VCT including channel information of a specified service. Specifically, when acquiring the virtual channel table that passes the check, the terminal may acquire, from a valid virtual channel table, channel information that the terminal can receive, and the terminal may acquire the channel information received by the terminal by parsing or extracting the channel information from the VCT.

In the first embodiment of the present disclosure, the first checksum and the second checksum are acquired on the network side and the terminal side respectively based on the broadcast service group identifier, so that each terminal may acquire a VCT corresponding to the terminal itself according to the check result in a manner of matching test on the terminal side, so as to acquire the complete channel information that the terminal can receive. In this embodiment, authorization of services according to levels and groups may be realized based on a simplified control system, an already deployed terminal is limited to being only capable of receiving basic programs in a case that software is not upgraded, while a subsequently released terminal may receive channel information of a service group to which the subsequently released terminal belongs.

Figure 2:
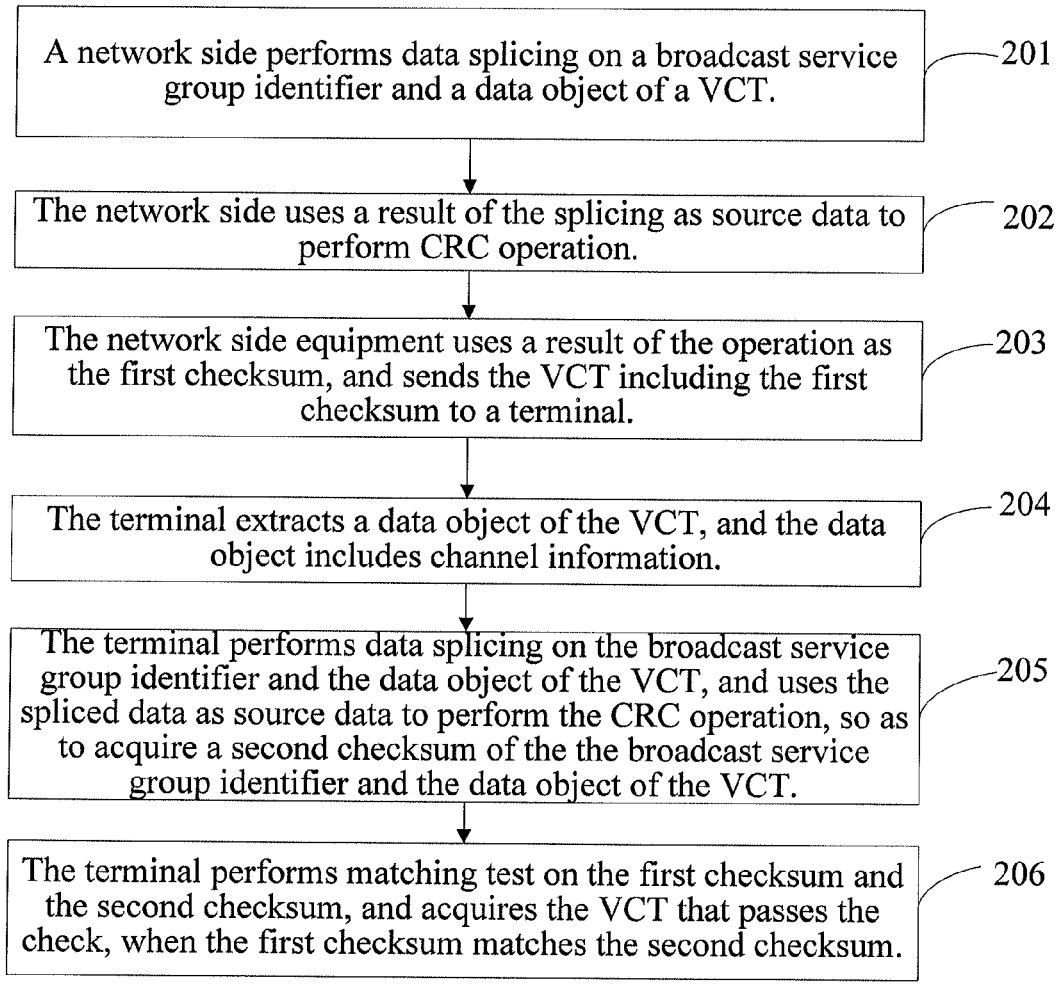
FIG. 2 is a flow chart of a second embodiment of a realization method for acquiring a virtual channel table according to the present disclosure.

Referring to FIG. 2, in a second embodiment of the present disclosure, realizing a method provided in the second embodiment of the present disclosure may include the following steps.

In step 201, network side equipment performs data splicing on a broadcast service group identifier and a data object of a VCT.

During the implementation of step 201, in the process of the data splicing, a check data object may be placed in front and the service group identifier, which is denoted as: the check data object ∥ the service group identifier; and the service group identifier may also be placed in front of the check data object, which is denoted as: the service group identifier ∥ the check data object (where ∥ is only one separator, and does not have any other meaning).

In step 202, the network side equipment uses a result of the splicing as source data to perform CRC operation.

In this embodiment, the network side uses a CRC operation method when acquiring the first checksum, and before performing the CRC operation, the network side firstly splices the data of the broadcast the service group identifier and the data object of the VCT. In a CRC operation method corresponding to the VCT, the service group identifier is required to be introduced, the data splicing is performed by using (the check data object ∥ the service group identifier) or (the service group identifier ∥ the check data object), and then the CRC operation is performed. The check data object is the data object of the VCT, and in practice, one specific example of the VCT may be as shown in Table 1:

TABLE 1

|  | Bits | Bytes | Format | Description |
|---|---|---|---|---|
| shortform_virtual_channel_table_section (){ |  |  |  | Short format virtual channel table section structure |
|     table_ID | 8 | 1 | uismsbf value 0xc4 | Table identifier |
|     zero | 2 | 2 | bslbf | Zero padding |
|     reserved | 2 |  | bslbf | Reserved field |

TABLE 1-continued

| | Bits | Bytes | Format | Description |
|---|---|---|---|---|
| section_length | 12 | | uimsbf | Section length |
| zero | 3 | 1 | bslbf | Zero padding |
| protocol_version | 5 | | See sec 4.4.1 | Protocol version number |
| transmission_medium | 4 | 1 | uimsbf | Transmission medium type |
| table_subtype | 4 | | uimsbf see table 5.14 | Sub-table type |
| VCT_ID | 16 | 2 | bslbf | virtual channel table identifier |
| if(table_subtype == DCM){ | | | | If a sub-table type is a DCM (Defined Channels Map, defined channels map) |
|     DCM_structure( ) | | | | DCM structure data |
| } | | | | |
| if(table_subtype == VCM){ | | | | If a sub-table is a VCM (Virtual Channels Map, virtual channels map) |
|     VCM_structure( ) | | | | VCM structure data |
| } | | | | |
| if(table_subtype == ICM){ | | | | If a sub-table is an ICM (Inverse Channels Map, inverse channels map) |
|     ICM_structure( ) | | | | ICM structure data |
| } | | | | |
| for(i=0; i<N; i++){ | | | | |
|     descriptor( ) | | | Optional | VCT descriptor |
| } | | | | |
| CRC_32 | 32 | 4 | rpchof | Checksum |
| } | | | | |

The data object of the VCT may be understood as a collection excluding the part of the "checksum". A value of the "checksum" field is the first checksum.

In a specific computation, the following manner may be adopted. For example, the data object of the VCT is A1 . . . An, and the group identifier is B1 . . . Bn, where the data object of the VCT and the group identifier are combined to be A1 . . . AnB1 . . . Bn according to a byte sequence. The CRC operation is performed, and the result of the computation is the first checksum.

In step 203, the network side equipment uses a result of the operation as the first checksum, and sends the VCT including the first checksum and the data object to a terminal.

The network side equipment uses the result of the computation as the first checksum, and sends the VCT including the first checksum and the data object to the terminal, so that the terminal performs the same CRC operation too, so as to match a VCT that should be received by the terminal.

In step 204, the terminal extracts the data object of the VCT, where the data object includes channel information.

In this step, after receiving the at least one virtual channel table delivered by the network side, the terminal extracts the data object from a data structure of the virtual channel table. The data object of each of the VCTs includes channel information that a corresponding terminal may receive, and further includes other check data in the VCT.

In step 205, the terminal performs data splicing on the broadcast service group identifier and the extracted data object, and uses the spliced data as source data to perform the CRC operation, so as to acquire a second checksum of the broadcast the service group identifier and the extracted data object.

In this embodiment, the terminal may support processing of the broadcast service group identifier, and after receiving the VCT, the terminal is required to adopt the same computation manner as the network side equipment does, that is, adopting (the data object of the VCT ∥ the service group identifier) or (the service group identifier ∥ the data object of the VCT) as an input of the CRC operation, and calculating the second checksum.

In step 206, the terminal performs matching on the first checksum and the second checksum, and acquires the VCT that passes the check from a plurality of VCTs delivered by the network side, when the first checksum matches the second checksum.

The terminal performs the matching test by calculating the acquired CRC, and only the VCT corresponding to the service group to which the terminal belongs can pass the CRC. That is to say, only the first checksum is capable of matching the second checksum, and then the terminal acquires the VCT that passes the check from the plurality of VCTs delivered by the network side according to a result of the matching. In a practical application, the VCT that passes the check includes all channel information that the terminal can receive. After acquiring the corresponding VCT, the terminal may obtain channel information in the VCT by parsing the VCT.

In this embodiment, both the network side and the terminal side adopt the data splicing manner to acquire the checksum, and in practice, the first checksum and the second checksum are acquired in the CRC operation manner, so that the terminal of the specified service group may be ensured to receive only a VCT corresponding to the terminal itself. Although each terminal may receive many VCTs, only the VCT that passes the check is valid. So that authorization management of grouped services of subscribers is realized on a simple control system, authorization of services according to levels and groups is realized based on a simplified control system, and meanwhile an already deployed terminal is limited to being only capable of receiving basic programs in a case that software is not upgraded.

Figure 3:
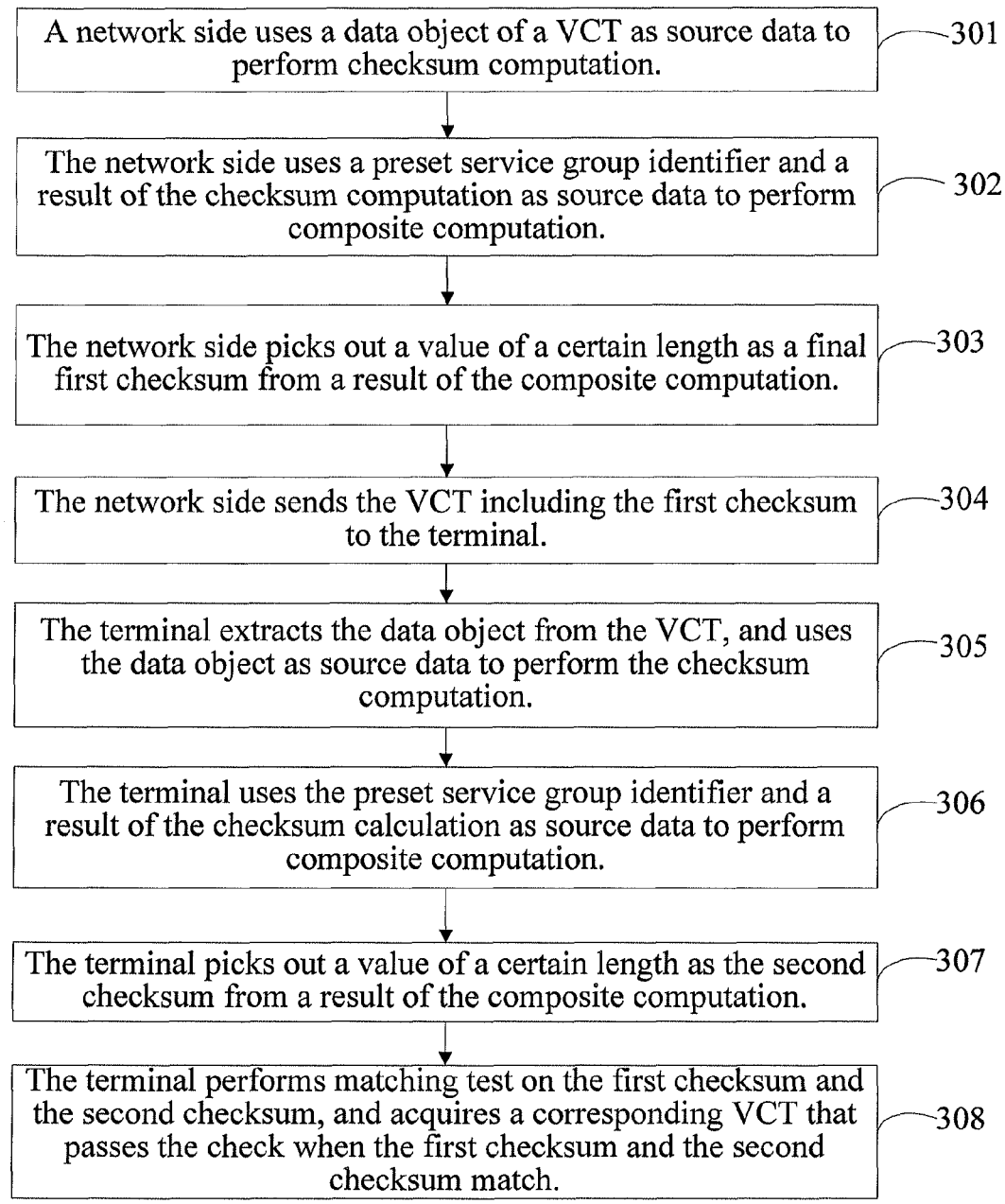
FIG. 3 is a flow chart of a third embodiment of a realization method for acquiring a virtual channel table according to the present disclosure.

Referring to FIG. 3, in a third embodiment of the present disclosure, a method provided in the third embodiment of the present disclosure may include the following steps.

In step 301, network side equipment performs checksum computation on a data object of a VCT.

Specifically, in this step, the checksum computation may be performed in manners of data splicing, composite computation, and extending a reserved field.

In step 302, the network side equipment uses a preset service group identifier and a result of the checksum computation as source data to perform the composite computation.

During the implementation of step 302, the network side equipment uses the result of the computation and the preset service group identifier as an input for performing the composite computation. The composite computation may include: cyclic redundancy check, CRC, Hash operation, block encryption operation, stream encryption operation, and exclusive-OR operation. For example, assume that the checksum of the VCT is computed by adopting a manner of $g(f(x), y)$, where x may be a data object of the VCT, and then y is a broadcast service group identifier; alternatively, x may be the broadcast service group identifier, and the y is the data object of the VCT; and f( ) and g( ) are general algorithms.

It should be noted that, in this embodiment, the composite computation as shown in step 302 may also be performed firstly, and then the checksum computation as shown in step 301 is performed. That is to say, a sequence of steps 302 and 301 may also be inversed, which does not affect the implementation of the embodiment of the present disclosure.

In step 303, the network side equipment picks out a value of a certain length as a final first checksum from a result of the composite computation.

When the Hash operation is adopted, taking the MD5 for example, an output is 128 bits, and any length thereof may be picked out, such as 32 bits, a value of the 32 bits is not necessarily consecutive, but the picking-out method is required to remain consistent on the network side equipment and on the terminal. Therefore, in this step, the network side equipment takes 32 bits of the output as the final first checksum.

When the block encryption operation is adopted, firstly the network side equipment computes a CRC value of the VCT, uses the CRC acquired through the computation as an input, uses the service group identifier as a key, performs the block encryption operation, and may likewise take 32 bits of a result of the encryption operation as the final first checksum. Likewise, the value of the 32 bit is not necessarily consecutive, but the picking-out method is required to remain consistent on the network side equipment and the terminal.

When the exclusive-OR operation is adopted, firstly the CRC value of the VCT is computed, then the CRC acquired through the computation is used as an input, exclusive-OR operation is performed bit (bit) by bit on the input and the service group identifier, and likewise, 32 bits thereof may also be taken as the final first checksum. Likewise, the value of the 32 bits is not necessarily consecutive, but the picking-out method is required to remain consistent on the network side and the terminal.

In step 304, the network side equipment sends the VCT including the first checksum and the data object to the terminal.

The network side equipment may cyclically send the VCT including the first checksum and the data object in sequence on a broadcast channel, that is, the cyclical sending is performed according to a certain set time period. The sending period may be set according to a practical case.

In step 305, the terminal extracts the data object of the VCT, and uses the data object to perform the checksum computation.

When receiving the VCT, the terminal firstly extracts the data object from the VCT, and then performs processing according to a corresponding computation method, that is, firstly the data object of the VCT is used as the source data to perform the checksum computation, so as to acquire the checksum.

In step 306, the terminal uses the preset service group identifier and a result of the CRC operation as source data to perform the composite computation.

According to the composite computation manner which the network side uses, the terminal performs the composite computation on the result of the CRC operation and the preset service group identifier in the same manner.

When the network side uses the Hash operation, the terminal side also uses the Hash operation. Assume that the CRC of the VCT is computed in a manner of $g(f(x), y)$, where x may be VCT data, and y is the service group identifier; x may also be the service group identifier, and y is the VCT data; and f(*) and g(*) are general algorithms, including but not limited to the Hash operation, the exclusive-OR operation, the block encryption operation, and the stream encryption operation.

It is noted that, when the network side firstly performs the composite computation, and then performs the checksum computation, that is, in a manner in which the composite computation is before the checksum computation, the terminal side is also required to perform the checksum computation according to the computation sequence of the network side, so that a valid VCT can be acquired.

In step 307, the terminal picks out a value of a certain length as the second checksum from a result of the composite computation.

The manner for picking out in Hash operation at the terminal is also required to be the same as that on the network side, that is, the length and position of the value picked out on the network side should be the same as those of the value picked out on the terminal side.

In step 308, the terminal performs matching test on the first checksum and the second checksum, and acquires a corresponding VCT that passes the check, when the first checksum and the second checksum match.

In this embodiment, when acquiring the corresponding VCT, the terminal uses the manner of firstly performing the CRC operation once and then performing the composite computation. Only the VCT on which the CRC operation is firstly performed once and then the composite computation is performed can match the terminal. The manner that the broadcast service group identifier is introduced into the composite computation may ensure accuracy and correctness of the matching of the computation on the network side and that on the terminal side, and may also ensure decrease of network transmission overhead.

Figure 4:
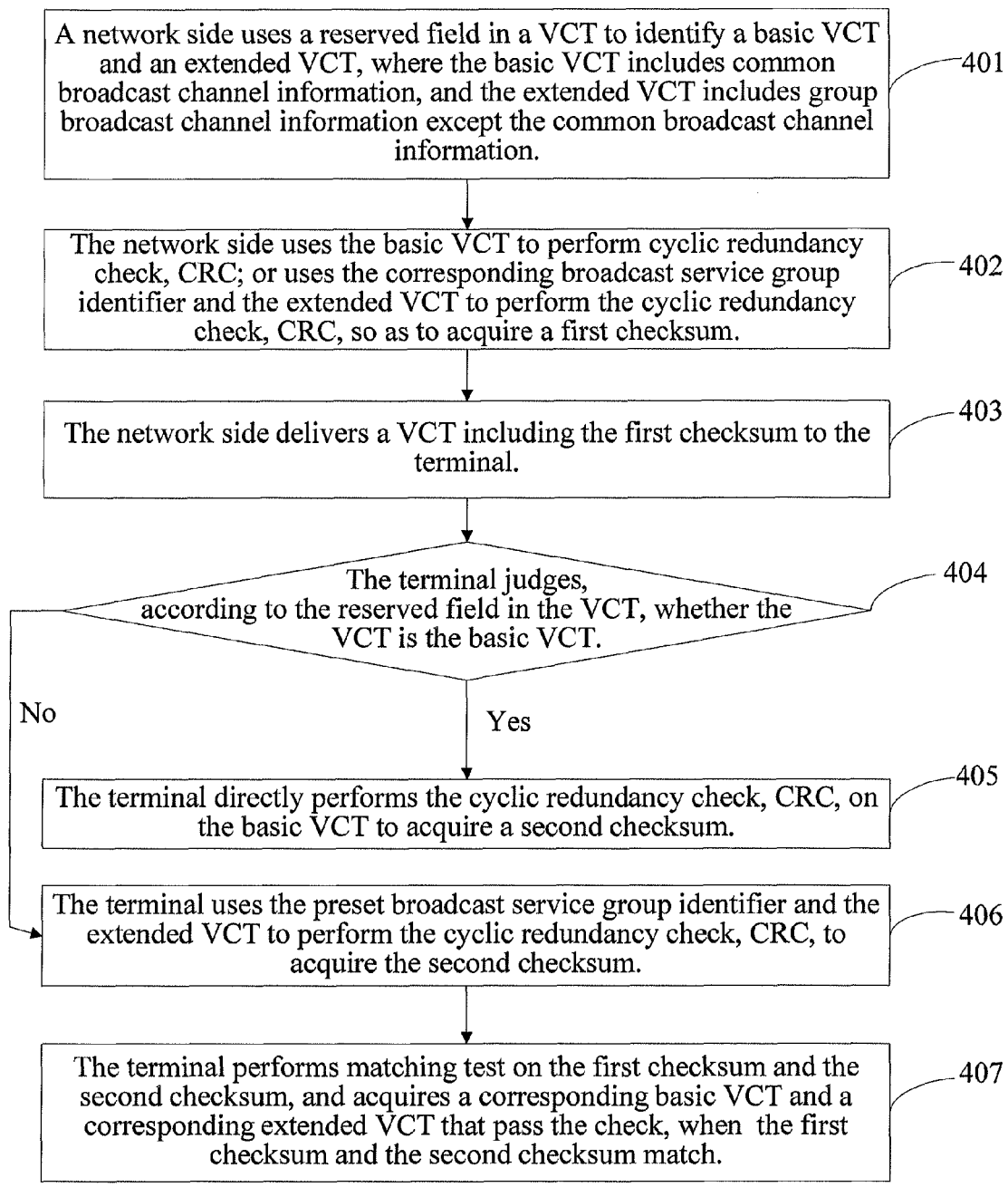
FIG. 4 is a flow chart of a fourth embodiment of a realization method for acquiring a virtual channel table according to the present disclosure.

Referring to FIG. 4, in a fourth embodiment of the present disclosure, a method provided in the fourth embodiment of the present disclosure may include the following steps.

In step 401, network side equipment uses a reserved field in a VCT to identify a basic VCT and an extended VCT. The basic VCT includes common broadcast channel information, and the extended VCT includes group broadcast channel information except the common broadcast channel information.

Referring to a syntax definition of the VCT in Table 1, where a reserved field of 2 bits exists, and the basic VCT and the extended VCT may be respectively defined based on the reserved field. The basic VCT includes common broadcast channel information, and the extended VCT includes group broadcast channel information except the common broadcast channel information. Assuming that the 2-bit reserved field of the basic VCT is x1x2, the 2-bit reserved field of the extended VCT is y1y2, where x1x2 is not the same as y1y2. According to the definition in the protocol, only binary digits are allowed here, that is, x and y can only be 0 or 1.

The network side equipment may combine the channel information in the basic VCT as well as the channel information in the extended VCT respectively according to a broadcast service group identifier, and the channel information in the basic VCT can be acquired by all subscribers by default. The channel information in the extended VCT corresponds to a corresponding service group, which includes channel information that can be acquired only by terminals in the service group.

In step 402, the network side equipment uses the basic VCT to perform cyclic redundancy check, CRC, or/and uses the corresponding broadcast service group identifier and the extended VCT to perform the cyclic redundancy check, CRC, so as to acquire a first checksum.

When organizing the basic VCT, the network side equipment fills the 2-bit reserved field with x1x2, and meanwhile the corresponding CRC computation does not involve any service group identifier. Meanwhile, when organizing the extended VCT, the network side equipment fills the 2-bit reserved field with y1y2, and meanwhile the corresponding CRC computation involves a service group identifier, that is, the corresponding broadcast service group identifier and the extended VCT are used to perform the CRC.

In step 403, the network side equipment delivers a VCT including the first checksum to the terminal.

In step 404, the terminal judges, according to the reserved field in the VCT, whether the VCT is the basic VCT. If the VCT is the basic VCT, perform step 405; if the VCT is not the basic VCT, perform step 406.

In this embodiment, when receiving the VCT, the terminal firstly judges whether the reserved field is x1x2, and if it is x1x2, it is indicated that the terminal side has no necessity of introducing the service group identifier, and step 405 is performed; if it is not x1x2, that is, the reserved field is identified as y1y2, and step 406 is performed.

In step 405, the terminal directly performs the cyclic redundancy check, CRC, on the basic VCT, so as to acquire a second checksum.

When calculating the CRC, the terminal does not introduce the service group identifier, and after judging that the VCT is valid, receives corresponding channel information as a basic channel table.

In step 406, the terminal uses the preset broadcast service group identifier and the extended VCT to perform the cyclic redundancy check, CRC, so as to acquire the second checksum.

If the reserved field is y1y2, the terminal introduces the service group identifier when calculating the CRC; and uses the preset broadcast service group identifier and the extended VCT to perform the cyclic redundancy check, CRC, so as to acquire the second checksum.

In step 407, the terminal performs matching test on the first checksum and the second checksum, and acquires a corresponding basic VCT and a corresponding extended VCT that pass the check, when the first checksum and the second checksum match.

After judging that the VCT is valid, the terminal acquires at the same time the corresponding basic VCT and the corresponding extended VCT that pass the check, and meanwhile channel information in the basic VCT and channel information in the extended VCT are combined together to cooperatively constitute complete channel information of an authorized service group.

In this embodiment, based on a VCT reserved field in an existing protocol, VCT attributes are extended and defined, combined transmission of the basic VCT and the extended VCT is realized, and the extended VCT does not include the channel information of the basic VCT, so as to reduce the amount of data of the extended VCT, and increase the channel transmission efficiency through the classification.

Meanwhile, in a practical application, the VCT reserved field in the existing protocol may be further extended, so as to realize the combined transmission of the basic VCT and the VCT extended according to levels and groups, reduce the amount of data of the extended VCT, and increase the network channel transmission efficiency. In the fourth embodiment, only two levels (basic and extended) of VCTs are taken into account, and definitely the VCT may be extended into VCTs of multiple levels (for example, four levels including 0, 1, 2, and 3).

Referring to a syntax definition of the VCT, where a reserved field of 2 bits exists, and the basic VCT and the extended VCT may be respectively defined based on the reserved field. The 2-bit reserved field defines a full set as {x1x2, y1y2, z1z2, m1m2}, and a definition of a corresponding field is set corresponding to each level of the classification. For example, if x1x2<y1y2<z1z2<m1m2, a VCT of a y1y2 level should include channel information of an x1x2 level, a VCT of a z1z2 level should include channel information of x1x2 and y1y2 levels, and a VCT of an m1m2 level should include channel information of x1x2, y1y2, and z1z2 levels. each bit of x1x2, y1y2, and z1z2 may be 0 or 1. For example, x1x2 is 00, y1y2 is 01, z1z2 is 10, and m1m2 is 11.

The details are shown in the following table:

| Level | Service group-level 1 | Service group-level 2 | Service group-level 3 | Service group-level 4 |
|---|---|---|---|---|
| x1x2 | basic->Ch List 0 | basic->Ch List 0 | basic->Ch List 0 | basic->Ch List 0 |
| y1y2 |  | A->Ch List A1 | A0->Ch List B1 | A0->Ch List B1 |
| z1z2 |  |  | B->Ch List B2 | B0->Ch List C2 |
| m1m2 |  |  |  | C->Ch List C3 |

Referring to the above table, for the level x1x2, channel information is Ch List 0, and no service group identifier participates in computation in CRC of a VCT corresponding to the channel information.

For the level y1y2, complete channel information is Ch List 0+Ch List A1, and a service group identifier A participates in computation for CRC of a VCT corresponding to the corresponding channel information.

For the level z1z2, complete channel information is Ch List 0+Ch List B1+Ch List B2, and a service group identifier B participates in computation in CRC of a VCT corresponding to a corresponding channel table. A service identifier corresponding to Ch List B1 is A0, and A0 is a y1y2 level common channel set, and is only used to extend a z1z2 level channel table.

Meanwhile, for the level m1m2, complete channel information is Ch List 0+Ch List B1+Ch List C2+Ch List C3, and a service group identifier C participates in computation in CRC of a VCT corresponding to a corresponding channel table. A service identifier corresponding to Ch List C2 is B0, and B0 is a z1z2 level common channel set, and is only used to extend an m1m2 level channel table.

Specifically, as for a multi-level grouping case, on the network side, a reserved field in a VCT is required to be used to identify a level of a service group, and the first checksum may be acquired by adopting the manner in the fourth embodiment according to the level. When receiving a VCT delivered by the network side, the terminal firstly acquires the level of the service group according to content of the reserved field, and may acquire a complete channel table according to information in the above table. A dynamic adding manner may also be adopted. In this case, for a common channel table, such as basic, A0, and B0, the network side is required to firstly deliver a corresponding service identifier to the terminal in a manner of presetting, and otherwise the terminal cannot recognize the common channel table.

It can be seen that, based on the reserved field in the VCT, a four-level channel information architecture may be defined, common channel information of the x1x2, y1y2, and z1z2 levels is extracted respectively for transmission, so as to reduce the system transmission overhead of the channel information as much as possible by classification.

Figure 5:
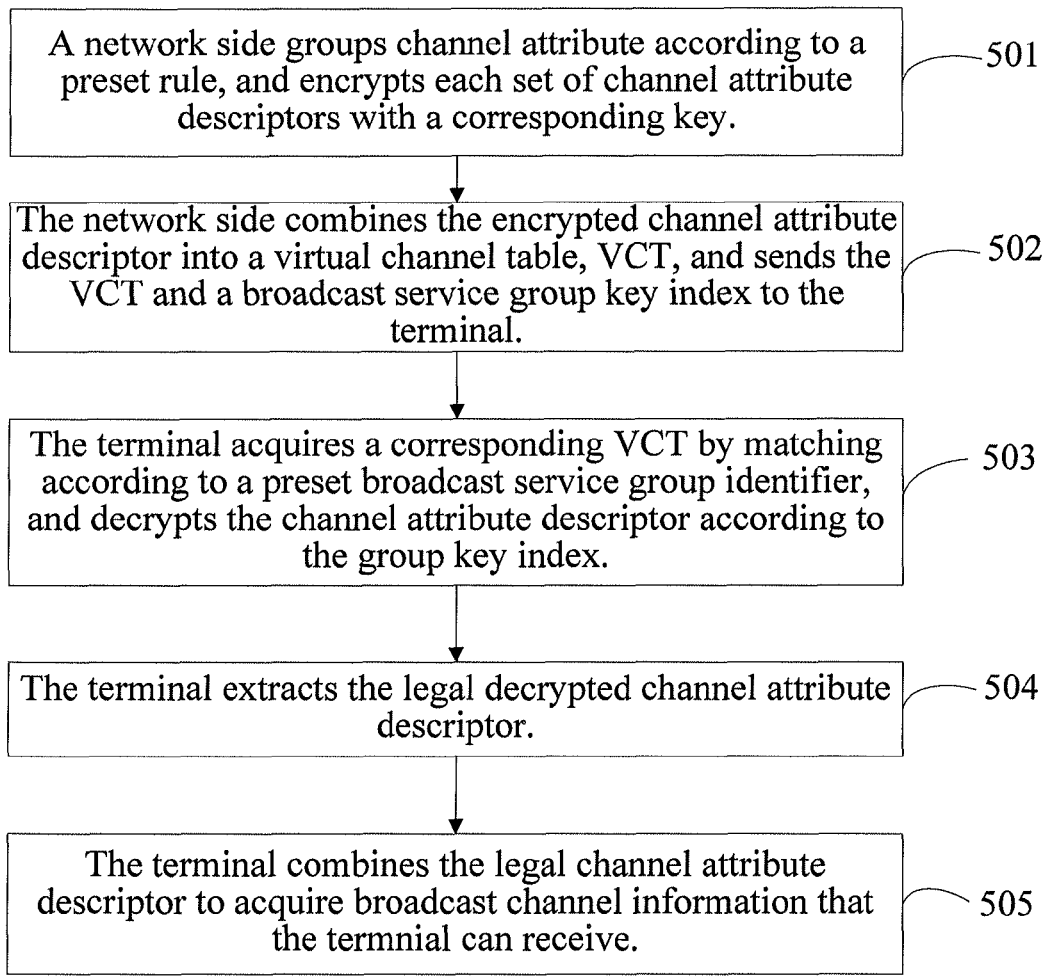
FIG. 5 is a flow chart of a fifth embodiment of a realization method for acquiring a virtual channel table according to the present disclosure.

Referring to FIG. 5, in a fifth embodiment of the present disclosure, a method provided in the fifth embodiment of the present disclosure may include the following steps.

In step 501, network side equipment groups channel attribute descriptors according to a preset rule, and encrypts each group of the channel attribute descriptors with corresponding keys.

Provided that a group key index SK has 8 bits (A1A2A3A4A5A6A7A8), eight keys corresponding to A1 to A8 respectively are generated at a network side. When A1 in SK is 0, it is indicated that channel information that is encrypted with the key corresponding to A1 is not used; when A1 in SK is 1, it is indicated that the channel information that is encrypted with the key corresponding to A1 is required to be used.

The channel information may be divided into eight groups of sets according to a certain attribute principle on the network side, and the attribute principle is actually characteristics for dividing the channel information. For example, a channel table is divided into eight groups of sets according to division of an adult level, according to division of scenarios (comedy, romance, . . . ), or according to division of an audience level (a basic package, an enhanced package, a super package, . . . ), and each group is allocated with one key index. Definitely, SK being 8 bits here is just an assumption, and SK of other lengths may be adopted.

In step 502, the network side equipment combines the encrypted channel attribute descriptor into a VCT, and sends the VCT and a broadcast service group key index to the terminal.

The channel information, that is the channel attribute descriptor, is encrypted with a corresponding key according to a group set attribute of the channel attribute descriptor, and then is combined into the extended VCT for transmission.

The channel attribute descriptor in practice may be as shown in Table 2:

TABLE 2

| | Bits | Bytes | Format | Description |
|---|---|---|---|---|
| Channel_properties_descriptor( ){ | | | | Channel attribute descriptor |
| descriptor_tag | 8 | 1 | uimsbf value 0x95 | Descriptor tag |
| descriptor_length | 8 | 1 | uimsbf | Length of a descriptor |
| channel_TSID | 16 | 2 | uimsbf | Transmission stream identifier of a channel |

TABLE 2-continued

| | Bits | Bytes | Format | Description |
|---|---|---|---|---|
| reserved | 6 | 1 | 111111 | Reserved field |
| out_of_band_channel | 1 | | uimsbf | An out-of-band channel or not |
| access_controlled | 1 | | uimsbf | The access is controlled or not |
| hide_guide | 1 | 1 | bslbf | Hidden or not |
| reserved | 1 | | 1 | Reserved |
| service_type | 6 | | uimsbf | Service type |
| } | | | | |

In step 503, the terminal acquires a corresponding VCT by matching according to a preset broadcast service group identifier, and decrypts the channel attribute descriptor according to the group key index.

The terminal may receive a matching extended VCT according to the preset broadcast service group identifier, and definitely, the terminal may also acquire a corresponding extended VCT by matching according to a VCT identifier (VCT-ID), may determine at the same time a channel subgroup which the current terminal may receive according to the received SK, and decrypts channel description information in the extended VCT one by one respectively with a corresponding key with the bit in SK being 1.

In step 504, the terminal extracts the valid decrypted channel attribute descriptor.

The terminal extracts a valid descriptor from the extracted channel attribute descriptor. For example, if A1 is 1, a key corresponding to A1 is used to decrypt the channel description information, and a valid descriptor is extracted after the decryption. Validity of the valid descriptor may be judged through a descriptor tag and a length of the descriptor together.

In step 505, the terminal combines the valid channel attribute descriptor, so as to acquire broadcast channel information that the terminal can receive.

The terminal then combines the extracted valid channel description information, which results in a complete channel table that the terminal may receive.

It should be noted that, based on the combining manner according to this embodiment, at most $2^8$ (that is, 256) service combinations may be supported, and definitely, when a length of the group key index varies, the supported service combination also vary correspondingly. Furthermore, based on the manner according to this embodiment, the extended VCT already includes all classified channel information, so only one extended VCT may be transferred, while a plurality of channel tables are not required to be transferred for a different service group, which effectively reduces the transmission overhead.

Meanwhile, through a configuration message, the service group key index SK may also be modified dynamically, which enhances the network transmission security, and supports dynamic switch between service groups at the same time. It can be seen that, in this embodiment, at the same time of delivering the service group identifier, the network side delivers the service group key index SK, so that filtering of the extended VCT may be realized through the service group identifier, and extracting of the channel information from the VCT encrypted according to levels and groups is realized through the service group key index SK, which effectively reduces the transmission overhead.

It should be noted that, for the foregoing method embodiments, for simplicity of description, the methods are described as a combination of a series of actions, but it should be clear to persons skilled in the art that the present disclosure is not limited by the sequence of the actions, as some steps may, according to the present disclosure, be performed in other sequences or concurrently. In addition, persons skilled in the art should also know that, the embodiments described in the specification are all exemplary embodiments, and the related actions and modules are not necessarily required by the present disclosure.

Figure 6:
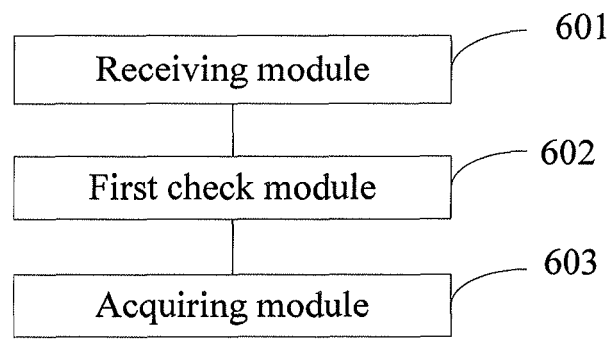
FIG. 6 is a schematic structural diagram of a realization device for acquiring a virtual channel table according to the first embodiment of the present disclosure.

Corresponding to the methods according to the embodiments of the present disclosure, referring to FIG. 6, the present disclosure further provides a device for acquiring a virtual channel table, and the device may include the following.

A receiving module 601 is configured to receive at least one virtual channel table, VCT, delivered by a network side, where the VCT includes a first checksum and a data object that are generated by a network side, and the data object includes channel information.

The device according to this embodiment may be integrated into a terminal, or the function of the device may be realized by a terminal, or the device may be an independent entity. Since broadcast channel information of different groups, that is, extended channel information, can not be acquired by all subscribers, the extended virtual channel table, VCT, is defined on the network side. The extended VCT includes a broadcast channel number, a broadcast channel name, a broadcast frequency point and a modulation manner. A service group identifier is required to be introduced into each set of CRC computation manners corresponding to the VCT, so the corresponding broadcast service group identifier and the VCT are used as source data on the network side, and the first checksum of the corresponding broadcast service group identifier and the VCT is computed. When the first checksum is computed, the first checksum may be acquired in the cyclic redundancy check (Cyclic Redundancy Check CRC) manner or with other manners. These other manners include but are not limited to a Hash operation, a block encrypt ion operation, a stream encryption operation, and an exclusive-OR operation. The data object includes channel information that the terminal may receive, and the data object is provided in the form of a data structure in the VCT.

It should be noted that, one network may include two types of terminals: a historical terminal (a terminal already deployed in the network but not supporting the computation manner involving the service group identifier), and a subsequently released terminal (which may be understood as an upgraded terminal, and is a terminal supporting broadcast service grouping). for common channel information which is defined as the basic VCT, the corresponding manner for acquiring the checksum remains unchanged on the network side, the service group identifier is not introduced, and the common channel information can be acquired by subscribers of all terminals (including the above two types of terminals). However, for the extended VCT corresponding to the extended channel table, only the subsequently released terminal supporting the broadcast service grouping is capable of obtaining a correct computation result. In this application, the terminals are all subsequently released terminals.

A first check module 602 is configured to use a preset broadcast service group identifier and the data object of the VCT, where the data object of the VCT is received by the receiving module 601, to acquire a second checksum of the broadcast service group identifier and the data object of the VCT.

It should be noted that, the manner in which the first check module 602 acquires the second checksum must be the same as the manner in which the network side acquires the first checksum.

An acquiring module 603 is configured to acquire a VCT that passes the check from at least one virtual channel table delivered by the network side, when the first checksum matches the second checksum.

The terminal performs matching on the first checksum acquired through computation by the terminal and the second checksum, and when the first checksum and the second checksum match, the acquiring module 603 acquires the corresponding VCT that passes the check, and the broadcast channel information included by the VCT is all complete channel information of the terminal.

In this embodiment, the first checksum and the second checksum are acquired respectively on the network side and the terminal side based on the broadcast service group identifier, so that each terminal may acquire a VCT corresponding to the terminal itself according to a check result in a manner of matching test on the terminal side, so as to acquire the complete channel information that the terminal can receive. In this embodiment, authorization of services according to levels and groups may be realized based on a simplified control system, an already deployed terminal is limited to being only capable of receiving basic programs in a case that software is not upgraded, while a subsequently released terminal may receive channel information of a service group to which the subsequently released terminal belongs. Meanwhile, without depending on the CA technology, authorization services according to groups and levels may also be realized based on a conventional simplified control system, which reduces the network transmission overhead.

Figure 7:
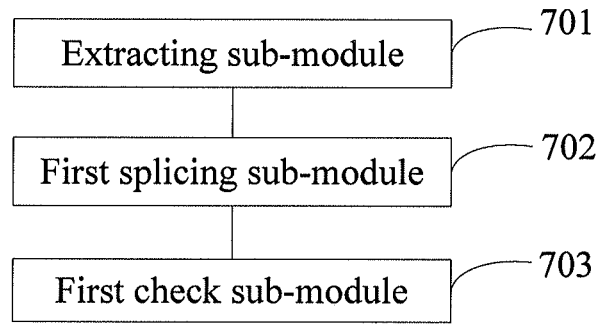
FIG. 7 is a schematic structural diagram of a second embodiment of a realization device for acquiring a virtual channel table according to the present disclosure.

In a second device embodiment of the present disclosure, referring to FIG. 7, a first check module 602 in this embodiment may include the following.

An extracting sub-module 701 is configured to extract a data object from a virtual channel table.

When receiving at least one virtual channel table delivered by a network side, the extracting sub-module 701 extracts the data object from a data structure of the virtual channel table, and the data object of each VCT includes channel information that a corresponding terminal may receive, and further includes other check data in the VCT.

A first splicing sub-module 702 is configured to perform data splicing on the broadcast service group identifier and the data object of the VCT.

In this embodiment, the terminal may support processing of the broadcast service group identifier, and after receiving the VCT, the terminal is required to adopt the same computation manner as the network side does, that is, adopting (the data object of the VCT ∥ the service group identifier) or (the service group identifier ∥ the data object of the VCT) to perform the data splicing.

A first check sub-module 703 is configured to use the spliced data as source data to perform cyclic redundancy check, CRC, where a result of the CRC is the second checksum.

A first check sub-module 703 may use the spliced result as an input of the CRC operation, and compute the second checksum. Subsequently, the acquiring module 603 may acquire a corresponding VCT that passes the check.

Figure 8:
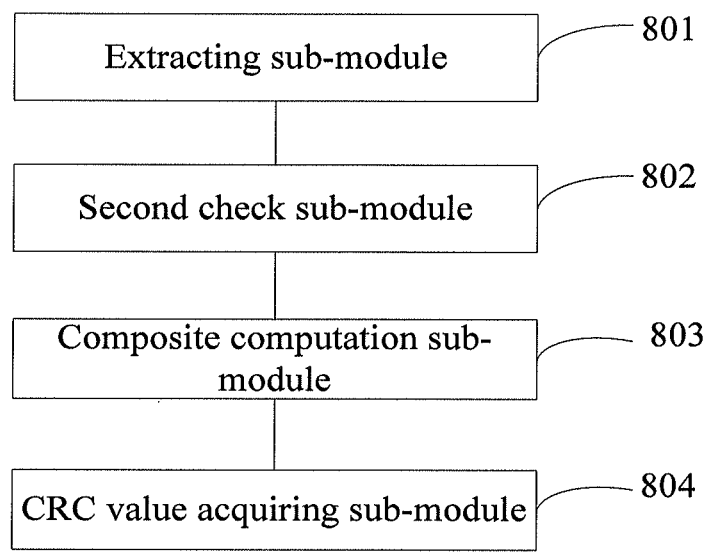
FIG. 8 is a schematic structural diagram of a third embodiment of a realization device for acquiring a virtual channel table according to the present disclosure.

Meanwhile, in a third device embodiment of the present disclosure, referring to FIG. 8, a first check module 602 in this embodiment may include the following.

An extracting sub-module 801 is configured to extract a data object from a virtual channel table.

A second check sub-module 802 is configured to use the data object of the VCT as source data to perform checksum computation.

When a terminal receives the VCT, firstly the second check sub-module 802 performs processing according to a corresponding computation method, that is, firstly the data object of the VCT is used as the source data to perform CRC operation, so as to acquire a result of the CRC operation.

A composite computation sub-module 803 is configured to use the preset service group identifier and the result of the checksum computation as source data to perform a composite computation.

It should be noted that, in this embodiment, a manner of the composite computation of the composite computation sub-module 803 is required to be the same as a manner of the composite computation adopted by the network side, that is, the composite computation is performed on the result of the CRC operation and the preset service group identifier on the terminal in the same manner. Furthermore, a sequence of the composite computation sub-module 803 and the second check sub-module 802 is not limited in the present disclosure, and a sequence relation of the composite computation sub-module 803 and the second check sub-module 802 does not affect realization of the embodiment of the present disclosure.

When the network side adopts the Hash operation, the composite computation sub-module 803 also adopts the Hash operation. Assume that the CRC of the VCT is computed in a manner of $g(f(x), y)$, where x may be VCT data, and y is the service group identifier; alternatively, x may also be the service group identifier, and y is the VCT data; and $f(*)$ and $g(*)$ are general algorithms, including but not limited to the Hash operation, the exclusive-OR operation, the block encryption operation, and the stream encryption operation.

A CRC value acquiring sub-module 804 is configured to pick out a value of a certain length as the second checksum from a result of the composite computation.

The manner for picking out in Hash operation at the terminal is also required to be the same as that on the network side, that is, the length and position of the value picked out on the network side should be the same as those of the value picked out on the terminal side. In this embodiment, when acquiring the corresponding VCT, the terminal adopt a manner of firstly performing the CRC operation once and then performing the composite computation, and on the network side, only the VCT on which the CRC operation is firstly performed once and then the composite computation is performed can match the terminal. This manner in which the broadcast service group identifier is introduced into the composite computation may ensure accuracy and correctness of the matching of the computation on the network side and that on the terminal side, and ensure decrease of network transmission overhead.

Figure 9:
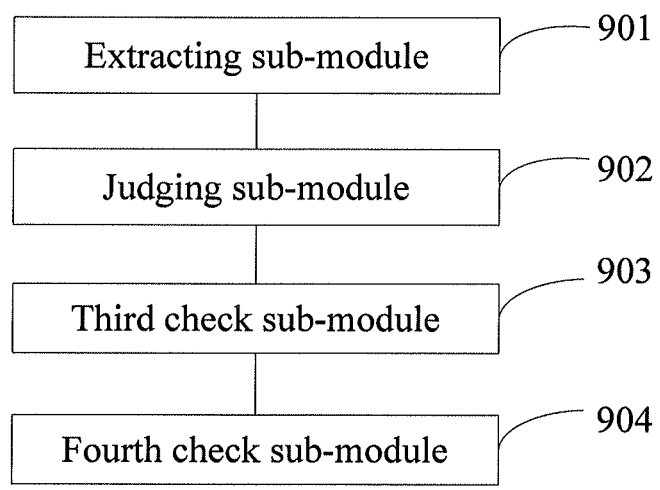
FIG. 9 is a schematic structural diagram of a fourth embodiment of a realization device for acquiring a virtual channel table according to the present disclosure.

Corresponding to the method in the fourth method embodiment of the present disclosure, referring to FIG. 9, in a device according to the embodiment of the present disclosure, a first check module 602 may include:

an extracting sub-module 901, configured to extract a data object from a VCT;

a judging sub-module 902, configured to judge, according to the reserved field in the VCT, whether the VCT is a basic VCT;

a third check sub-module 903, configured to directly acquire a checksum of the basic VCT as the second checksum, when a result of the judging sub-module is that the VCT is a basic VCT; and a fourth check sub-module 904, configured to use the preset broadcast service group identifier and the data object of the extended VCT to acquire the second checksum of the preset broadcast service group identifier and the data object of the extended VCT, when the result of the judging sub-module is that the VCT is not a basic VCT.

In this embodiment, the acquiring module 603 is configured to acquire the corresponding basic VCT and the corresponding extended VCT that pass the check. That is, after judging that the VCT is valid, the terminal acquires at the same time the corresponding basic VCT and the corresponding extended VCT that pass the check, and meanwhile channel information in the basic VCT and channel information in the extended VCT are combined together to cooperatively constitute complete channel information of an authorized service group. In this embodiment, based on a VCT reserved field in an existing protocol, VCT attributes are extended and defined, combined transmission of the basic VCT and the extended VCT is realized, and the extended VCT does not include the channel information of the basic VCT, which reduces the amount of data of the extended VCT, and increases the channel transmission efficiency through classification.

Figure 10:
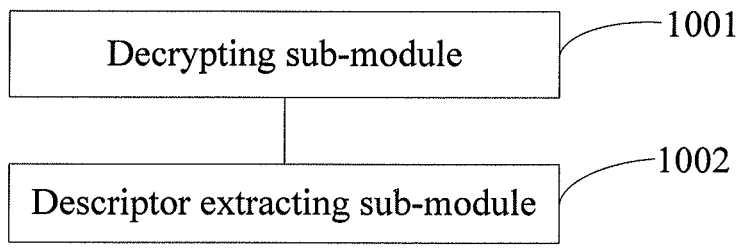
FIG. 10 is a schematic structural diagram of a fifth embodiment of a realization device for acquiring a virtual channel table according to the present disclosure.

Corresponding to the method in the fifth method embodiment of the present disclosure, referring to FIG. 10, in a device according to the embodiment of the present disclosure, a first check module 602 may include the following.

A decryption sub-module 1001 is configured to decrypt the encrypted channel attribute descriptor in the VCT according to the preset broadcast service group identifier and the group key index.

The terminal may receive a matching extended VCT according to the preset broadcast service group identifier, and definitely, the terminal may also acquire a corresponding extended VCT by matching according to a VCT identifier (VCT-ID), may determine, according to the received SK at the same time. a channel sub-group that the current terminal may receive, and decrypt channel description information in the extended VCT one by one respectively with a corresponding key with the bit of SK being 1.

A descriptor extracting sub-module 1002 is configured to extract the valid decrypted channel attribute descriptor.

The descriptor extracting sub-module 1002 extracts a valid descriptor from the extracted channel attribute descriptor. For example, if A1 is 1, a key corresponding to A1 is used to decrypt the channel description information, and a valid descriptor is extracted after the decryption. The terminal then combines the extracted valid channel description information together, which results in a complete channel table the terminal may receive.

The acquiring module 603 is configured to combine the valid channel attribute descriptor, so as to acquire broadcast channel information that the acquiring module 603 can receive.

Figure 11:
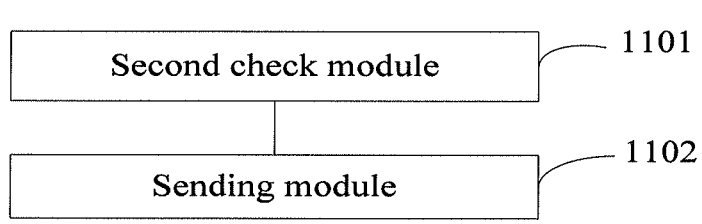
FIG. 11 is a schematic structural diagram of a first embodiment of a realization device for broadcast service grouping according to the present disclosure.

Corresponding to the methods according to the foregoing embodiments of the present disclosure, referring to FIG. 11, the present disclosure further provides a first embodiment of a realization device for broadcast service grouping, and the device may include the following.

A second check module 1101 is configured to use a corresponding broadcast service group identifier and a VCT for broadcast channel information of different groups to acquire a first checksum of the corresponding broadcast service group identifier and the VCT.

The device according to this embodiment may be integrated into a network side, or the function of the device may be directly realized by a network side, or the device may be one independent entity connected to the network side. Since broadcast channel information of different groups, that is, extended channel information, cannot be acquired by all subscribers, the extended VCT is defined on the network side. The extended VCT includes a broadcast channel number, a broadcast channel name, a broadcast frequency point or a modulation method. A service group identifier is required to be introduced into a set of CRC computation manners corresponding to the VCT, so the corresponding broadcast service group identifier and the VCT are used as the source data on the network side, and the first checksum of the corresponding broadcast service group identifier and the VCT is computed. When the first checksum is computed, the first checksum may be acquired in the cyclic redundancy check (Cyclic Redundancy Check, CRC) manner or in other manners.

It should be noted that, for common channel information that can be acquired by all terminal subscribers and is defined as the basic VCT, the corresponding method for acquiring the checksum remains unchanged on the network side, and the service group identifier is not introduced.

A sending module 1102 is configured to de liver the VCT including the first checksum and a data object to a terminal, so as to realize the broadcast service grouping. The data object includes channel information.

The sending module 1102 sends the VCT including the first checksum to the terminal, where the virtual channel table, VCT, includes the first checksum of the network side.

In the first embodiment of the present disclosure, the first checksum and the second checksum are acquired on the network side and the terminal side respectively based on the broadcast service group identifier, so that each terminal may acquire a VCT corresponding to the terminal according to a check result in a manner of matching test on the terminal side, so as to acquire the complete channel information that the terminal can receive. In this embodiment, authorization of services according to levels and groups may be realized based on a simplified control system, an already deployed terminal is limited to being only capable of receiving basic programs in a case that software is not upgraded, while a subsequently released terminal may receive channel information of a service group to which the subsequently released terminal belongs.

Figure 12:
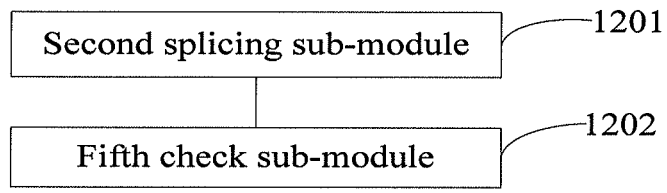
FIG. 12 is a schematic structural diagram of a second embodiment of a realization device for broadcast service grouping according to the present disclosure.

Referring to FIG. 12, in a second embodiment of a realization device for broadcast service grouping according to the present disclosure, the second check module 1101 may include the following.

A second splicing sub-module 1201 is configured to perform data splicing on the broadcast service group identifier and the data object of the VCT.

In this embodiment, the network side adopts an operation manner of cyclic redundancy check, CRC, when acquiring the first checksum, and before performing the CRC operation, firstly performs data splicing on the broadcast the service group identifier and the data object of the VCT. In a CRC operation manner corresponding to the VCT, the service group identifier is required to be introduced, the data splicing is performed by adopting (the check data object ‖ the service group identifier) or (the service group identifier ‖ the check data object), and then the CRC operation is performed. The check data object is the data object of the VCT.

A fifth check sub-module 1202 is configured to use the spliced data as source data to perform the CRC operation.

In specific computation in this embodiment, a manner may be adopted as follows. For example, the data object of the VCT is A1 ... An, and the group identifier is B1 ... Bn, where the data object of the VCT and the group identifier may be combined to be A1 ... AnB1 ... Bn according to a byte sequence; the CRC operation is performed, and the computation result is the first checksum, so that subsequently, the network side uses the computation result as the first checksum, and sends the VCT including the first checksum to the terminal.

Figure 13:
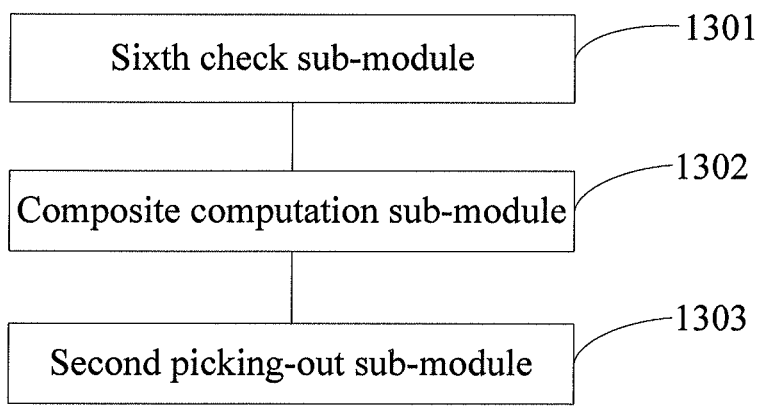
FIG. 13 is a schematic structural diagram of a third embodiment of a realization device for broadcast service grouping according to the present disclosure.

Alternatively, referring to FIG. 13, which is a structural block diagram of a third device embodiment according to the present disclosure. As shown in the drawing, the second check module in the realization device for the broadcast service grouping in this embodiment may include the following.

A sixth check sub-module 1301 is configured to use the data object of the VCT as source data to perform checksum computation.

In this embodiment, the sixth check sub-module 1301 firstly uses the data object of the VCT as the source data to perform CRC operation.

A composite computation sub-module 1302 is configured to use the preset service group identifier and a result of the checksum computation as source data to perform composite computation.

The result of the computation and the preset service group identifier are used as an input for performing the composite computation. A manner for calculating the checksum, or the composite computation may include the cyclic redundancy check, CRC, the Hash operation, the block encryption operation, the stream encryption computation, and the exclusive-OR operation.

A second picking-out sub-module 1303 is configured to pick out a value of a certain length from a result of the composite computation to use as the first checksum.

When the Hash operation is adopted, taking the MD5 for example, an output is 128 bits, and any length thereof may be picked out, such as 32 bits, a value of the 32 bits is not necessarily consecutive, but the picking-out method is required to be maintained consistent on the network side and the terminal. Therefore, in this step, the network side takes 32 bits of the output as the final first checksum.

When the block encryption operation is adopted, firstly the network side computes a CRC value of the VCT, uses the CRC acquired through the computation as an input, uses the service group identifier as a key, performs the block encryption operation, and may likewise take 32 bits of a result of the encryption computation as the final first checksum.

When the exclusive-OR operation is adopted, firstly the CRC value of the VCT is computed, then the CRC acquired through the computation is used as an input, bit-by-bit exclusive-OR operation is performed on the input and the service group identifier, and likewise, 32 bits thereof may also be taken as the final first checksum.

Figure 14:
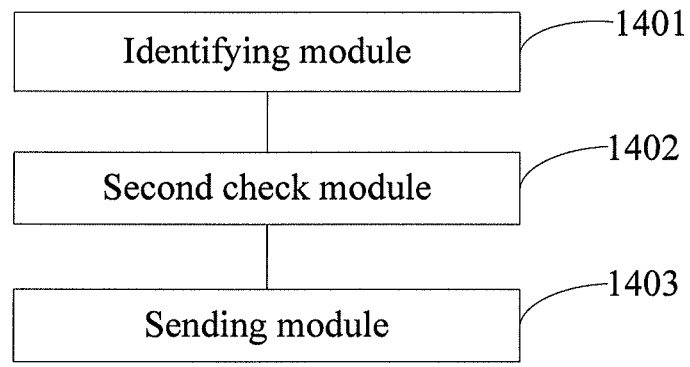
FIG. 14 is a schematic structural diagram of a fourth embodiment of a realization device for broadcast service grouping according to the present disclosure.

In this embodiment, on the network side, only the VCT on which the CRC operation is firstly performed once and then the composite computation is performed can match the terminal. The manner in which the broadcast service group identifier is introduced into the composite computation may ensure accuracy and correctness of the matching of computation on the network side and that on the terminal side, and ensure decrease of the network transmission overhead. Referring to FIG. 14, which is a schematic structural diagram of a fourth embodiment of a realization device for the broadcast service grouping according to the present disclosure. As shown in the drawing, the device may include the following.

An identifying module 1401 is configured to use a reserved field in a VCT to identify a basic VCT and an extended VCT. The basic VCT includes common broadcast channel information, and the extended VCT includes group broadcast channel information except the common broadcast channel information.

Referring to a syntax definition of the VCT in Table 1, a reserved field of 2 bits exists, and the basic VCT and the extended VCT may be respectively defined based on the reserved field. The basic VCT includes common broadcast channel information, and the extended VCT includes group broadcast channel information except the common broadcast channel information. Assuming that a 2-bit reserved field of the basic VCT is x1x2, a 2-bit reserved field of the extended VCT is y1y2, and x1x2 is not the same as y1y2. According to the definition in the protocol, only binary digits are allowed here, that is, x or y can only be 0 or 1.

The channel information in the basic VCT can be acquired by all subscribers by default. The channel information in the extended VCT corresponds to a corresponding service group, which includes channel information can be acquired only by terminals in the service group.

A second check module 1402 is configured to use the basic VCT to perform the cyclic redundancy check, CRC, and use a result of the CRC as the first checksum; or use the corresponding broadcast service group identifier and the extended VCT to perform the cyclic redundancy check, CRC, and use a result of the CRC as the first checksum.

When organizing the basic VCT, the network side fills the 2-bit reserved field with x1x2, and meanwhile the corresponding CRC computation does not involve any service group identifier.

Alternatively, when organizing the extended VCT, the network side fills the 2-bit reserved field with y1y2, and meanwhile the corresponding CRC computation involves a service group identifier, that is, the corresponding broadcast service group identifier and the extended VCT are used to perform the cyclic redundancy check, CRC.

A sending module 1403 is configured to deliver the VCT including the first checksum to the terminal, so as to realize the broadcast service grouping.

In this embodiment, based on a VCT reserved field in an existing protocol, VCT attributes are extended and defined, combined transmission of the basic VCT and the extended VCT is realized, and the extended VCT does not include the channel information of the basic VCT, which reduce the amount of data of the extended VCT, and increases the channel transmission efficiency through the classification.

Figure 15:
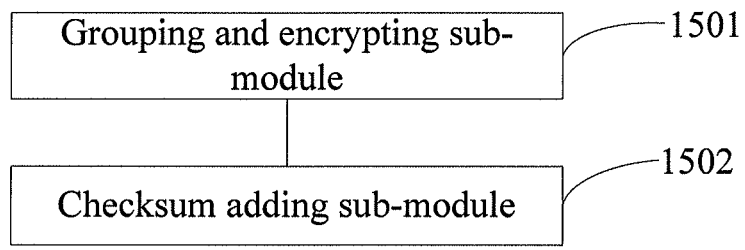
FIG. 15 is a schematic structural diagram of a fourth embodiment of a realization device for broadcast service grouping according to the present disclosure.

Referring to FIG. 15, which is a fifth embodiment of a schematic structural diagram of a realization device for the broadcast service grouping according to the present disclosure. As shown in the drawing, the second check module may include the following.

A grouping and encrypting sub-module 1501 is configured to group channel attribute descriptors according to a preset rule, and encrypt each group of channel attribute descriptors with a corresponding key.

Assuming that a group key index SK is 8 bits (A1A2A3A4A5A6A7A8), eight keys respectively corresponding to A1 to A8 are generated on a network side. When A1 in SK is 0, it is indicated that channel information that is encrypted with a key corresponding to A1 is not used; when A1 in SK is 1, it is indicated that the channel information that is encrypted with the key corresponding to A1 is required to be used.

The channel information may be divided into eight groups of sets according to a certain attribute principle on the network side, and the attribute principle is actually characteristics for dividing the channel information. For example, a channel table is divided into eight groups of sets according to division of an adult level, according to division of scenarios (comedy, romance, . . . ), or according to division of an audience level (a basic package, an enhanced package, a super package, . . . ), and each group is allocated with one key index. Definitely, SK being 8 bits here is just an assumption, and SK of other lengths may be adopted.

A checksum adding sub-module 1502 is configured to combine the encrypted channel property descriptors as a first checksum to add the first checksum into the VCT.

That is, the channel attribute descriptor is encrypted with a corresponding key according to a group set attribute of the channel attribute descriptor, and then is combined into the extended VCT for transmission.

In this embodiment, it can be seen that, in this embodiment, at the same time of delivering the service group identifier, the network side delivers the service group key index SK, filtering of the extended VCT may be realized through the service group identifier, and extracting of the channel information from VCT encrypted according to levels and groups is realized through the service group key index SK, which effectively reduces the transmission overhead.

Figure 16:
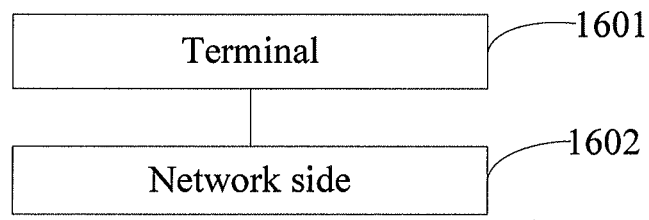
FIG. 16 is a schematic structural diagram of a system for acquiring broadcast channel information according to an embodiment of the present disclosure.

Referring to FIG. 16, which shows an embodiment of a realization system for broadcast service grouping according to the present disclosure. As shown in the drawing, the system may include the following.

A terminal 1601 is configured to: receive at least one virtual channel table, VCT, delivered by a network side, where the VCT includes a first checksum and a data object that are generated by the network side; use a preset broadcast service group identifier and the data object of the VCT to acquire a second checksum of the preset broadcast service group identifier and the data object of the VCT; and acquire a VCT that passes check from the at least one VCT delivered by the network side, when the first checksum matches the second checksum.

A network side 1602 is configured to: use a corresponding broadcast service group identifier and a virtual channel table, VCT, for broadcast channel information of different groups to acquire a first checksum of the corresponding broadcast service group identifier and the VCT; and deliver the VCT including the first checksum to the terminal, so as to realize the broadcast service grouping.

It should be noted that, the realization method and device for the broadcast service grouping are introduced very exhaustive, so for inexhaustive contents of the embodiment of the realization system for the broadcast service grouping, reference may be made to the description of the embodiments of the realization method and device for the broadcast service grouping, and the system is not described in detail herein.

It should be further noted that, relation terms herein such as first and second are only configured to distinguish one entity or operation from another entity or operation, while none of such practical relations or sequences is necessarily required or implied to exist among these entities or operations. Furthermore, terms "include", "involve" or any other variants thereof are intended to cover nonexclusive inclusion, so that a procedure, a method, an article or an equipment including a series of elements not only includes those elements, but also includes other elements without being explicitly listed, or includes inherent elements of the procedure, the method, the article or the equipment. In a case of no more limitations, elements limited by a sentence of "includes a . . . " do not exclude that other same elements further exist in the procedure, the method, the article or the equipment including the elements.

Through the descriptions of the preceding embodiments, those skilled in the art may understand that the present disclosure may be realized by using hardware only or may be implemented by software plus a necessary universal hardware platform. Based on such understandings, the solutions in the present disclosure may be embodied in the form of a software product. The software product may be stored in a nonvolatile storage medium (which may be a CD-ROM, USB flash drive, or a removable hard drive), including several instructions that enable a computer device (personal computer, server, or network device) having a processor to execute the methods provided in the embodiments of the present disclosure.

The method, device and system for broadcast service grouping according to the embodiments of the present disclosure are introduced in detail in the foregoing. Specific examples are used herein to set forth the principle and the implementation of the present disclosure, and the foregoing illustration of the embodiments is only used to facilitate the understanding of the methods and the ideas of the present disclosure. Meanwhile, persons having ordinary skill in the art can make variations and modifications to the present disclosure in terms of the specific implementations and application scopes according to the ideas of the embodiments of the present disclosure. Therefore, the specification shall not be construed as limitations to the present disclosure.

What is claimed is:

1. A method performed by a terminal for acquiring a virtual channel table by a subscriber device, comprising:
    communicating information that uniquely identifies the terminal to a network side;
    receiving, from the network side, a first message that includes a broadcast service group identifier associated with the terminal;
    storing, by the terminal, the broadcast service group identifier to a storage device of the terminal;
    receiving, from the network side, a second message that includes at least one virtual channel table (VCT) that comprises a first checksum and a data object that defines channel information, wherein the network side generates the first checksum based on a broadcast service group identifier associated with the VCT and the data object;
    generating, by the terminal, a second checksum based on the broadcast service group identifier and the data object of the VCT;
    comparing the first check sum included in the received VCT with the generated second check sum; and
    determining that that the VCT is associated with the terminal when the first checksum matches the second checksum,
    wherein the second message is received as a separately transmitted message after receiving the first message, and
    wherein the virtual channel table comprises a basic virtual channel table and an extended virtual channel table, the basic virtual channel table comprises common broadcast channel information, the extended virtual channel table comprises group broadcast channel information except the common broadcast channel information, and the basic virtual channel table and the extended virtual channel table are identified by using a reserved field; and
    generating the second checksum comprises:
    extracting the data object from the virtual channel table;
    judging, according to the reserved field in the virtual channel table, whether the virtual channel table is a basic virtual channel table, and directly acquiring a checksum of the basic virtual channel table as the second checksum if the virtual channel table is a basic virtual channel table; and
    using the preset broadcast service group identifier and extracted data object to acquire the second checksum of the preset broadcast service group identifier and extracted data object if the virtual channel table is not a basic virtual channel table; and
    wherein determining that the VCT is associated with the terminal when the first checksum matches the second checksum comprises:
    acquiring a basic virtual channel table and an extended virtual channel table that pass the check from the at least one virtual channel table.

2. The method according to claim 1, wherein using the preset broadcast service group identifier and the data object of the virtual channel table to acquire the second checksum of the preset broadcast service group identifier and the data object of the virtual channel table comprises:
    extracting the data object from the virtual channel table;
    performing data splicing on the broadcast service group identifier and the extracted data object; and
    using a spliced result as source data to perform cyclic redundancy check (CRC), wherein a result of the CRC comprises the second checksum.

3. The method according to claim 1, wherein the using the preset broadcast service group identifier and the extracted data object to acquire the second checksum of the preset broadcast service group identifier and the extracted data object comprises:
    extracting the data object from the virtual channel table;
    using the data object of the virtual channel table as source data to perform checksum computation;
    using the preset service group identifier and a result of the checksum computation as source data to perform composite computation; and
    picking out a value of a proper length from a result of composite computation to use as the second checksum.

4. The method according to claim 1, wherein the first checksum is an encrypted channel attribute descriptor and a broadcast service group key index, and the using the preset broadcast service group identifier and the data object of the virtual channel table to acquire the second checksum of the preset broadcast service group identifier and the data object of the virtual channel table comprises:
    decrypting the encrypted channel attribute descriptor in the virtual channel table according to the preset broadcast service group identifier and the group key index;
    extracting the valid decrypted channel attribute descriptor; and
    the acquiring the virtual channel table that passes the check from the at least one virtual channel table comprises:
    combining the valid channel attribute descriptor, so as to acquire broadcast channel information that the terminal can receive.

5. A method performed by a network side for broadcast service grouping, comprising:
    receiving, from a terminal, information that uniquely identifies the subscriber device;
    determining a broadcast service group identifier associated with the terminal;
    communicating, to the terminal, a first message that includes a broadcast service group identifier associated with the terminal;
    generating a first check sum based on the broadcast service group identifier and a virtual channel table (VCT) that includes a data object that defines broadcast channel information of different groups;
    including the first check sum within the virtual channel table; and
    communicating, to the terminal, a second message that includes the virtual channel table to the terminal, wherein the terminal is configured to:
communicate information that uniquely identifies the terminal to a network side;
receive, from the network side, a first message that includes a broadcast service group identifier associated with the terminal;
storing the broadcast service group identifier to a storage device of the terminal;
receive a second message that includes at least one virtual channel table (VCT) that comprises a first checksum and a data obiect that defines channel information, wherein the network side generates the first checksum based on a broadcast service group identifier associated with the VCT and the data object;
generate a second checksum based on the broadcast service group identifier and the data obiect of the VCT;
compare the first check sum included in the received VCT with the generated second check sum; and
determine that that the VCT is associated with the terminal when the first checksum matches the second checksum
wherein the second message is received as a separately transmitted message after receiving the first message,
wherein the virtual channel table comprises a basic virtual channel table and an extended virtual channel table, the basic virtual channel table comprises common broadcast channel information, the extended virtual channel table comprises group broadcast channel information except the common broadcast channel information, and the basic virtual channel table and the extended virtual channel table are identified by using a reserved field; and
wherein in generating the second checksum, the terminal is configured to:
extract the data object from the virtual channel table;
judge, according to the reserved field in the virtual channel table, whether the virtual channel table is a basic virtual channel table, and directly acquiring a checksum of the basic virtual channel table as the second checksum if the virtual channel table is a basic virtual channel table; and
use the preset broadcast service group identifier and extracted data object to acquire the second checksum of the preset broadcast service group identifier and extracted data object if the virtual channel table is not a basic virtual channel table; and
wherein in determining that the VCT is associated with the terminal when the first checksum matches the second checksum the terminal is configured to:
acquire a basic virtual channel table and an extended virtual channel table that pass the check from the at least one virtual channel table.

6. The method according to claim 5, wherein the using the corresponding broadcast service group identifier and the virtual channel table to acquire the first checksum of the corresponding broadcast service group identifier and the virtual channel table comprises:
perform data splicing on the broadcast service group identifier and the data object of the virtual channel table; and
using the spliced data as source data to perform CRC computation.

7. The method according to claim 5, wherein the using the corresponding broadcast service group identifier and the virtual channel table as the source data and acquiring the first checksum of the corresponding broadcast service group identifier and the virtual channel table comprises:
using the data object of the virtual channel table as the source data to perform checksum computation;
using the preset service group identifier and a result of the checksum computation as source data to perform composite computation; and
picking out a value of a certain length as the first checksum from a result of the composite computation.

8. The method according to claim 5, further comprising:
using a reserved field in the virtual channel table to identify the basic virtual channel table and the extended virtual channel table, wherein the basic virtual channel table comprises common broadcast channel information, and the extended virtual channel table comprises group broadcast channel information except the common broadcast channel information; and
the using the corresponding broadcast service group identifier and the virtual channel table as the source data and acquiring the first checksum of the corresponding broadcast service group identifier and the virtual channel table comprises:
using the corresponding broadcast service group identifier and the basic virtual channel table to perform the cyclic redundancy check (CRC), and using a result of the CRC as the first checksum; or
using the corresponding broadcast service group identifier and the extended virtual channel table to perform the cyclic redundancy check, CRC, and using a result of the CRC as the first checksum.

9. The method according to claim 5, wherein the acquiring the first checksum of the corresponding broadcast service group identifier and the virtual channel table from the at least one virtual channel table comprises:
grouping channel attribute descriptors according to a preset rule, and encrypting each group of channel attribute descriptors with a corresponding key; and
combining the encrypted channel attribute descriptors to be added into the virtual channel table as the first checksum, and sending the virtual channel table and a broadcast service group key index to the terminal.

10. A device for acquiring a virtual channel table, comprising:
a processor; and
a non-transitory storage medium that includes instructions code executable by the processor for causing the processor to perform acts of:
communicating information that uniquely identifies the device to a network side;
receiving, from the network side, a first message that includes a broadcast service group identifier associated with the device;
storing the broadcast service group identifier to a storage device of the terminal;
receiving, from the network side, a second message that includes a virtual channel table (VCT) that comprises a first checksum and a data object that defines channel information, wherein the network side generates the first checksum based on a broadcast service group identifier associated with the VCT and the data object;
a first check operation for generating a second checksum based on the broadcast service group identifier and the data object of the VCT;
comparing the first check sum included in the received VCT with the generated second check sum; and
determining that that the VCT is associated with the terminal when the first checksum matches the second checksum
wherein the second message is received as a separately transmitted message after receiving the first message, wherein the virtual channel table comprises a basic virtual channel table and an extended virtual channel table, the basic virtual channel table comprises common broadcast channel information, the extended virtual channel table comprises group broadcast channel information except the common broadcast channel information, and the basic virtual channel table and the extended virtual channel table are identified by using a reserved field; and generating the second checksum comprises:

extracting the data object from the virtual channel table;

judging, according to the reserved field in the virtual channel table, whether the virtual channel table is a basic virtual channel table, and directly acquiring a checksum of the basic virtual channel table as the second checksum if the virtual channel table is a basic virtual channel table; and using the preset broadcast service group identifier and extracted data object to acquire the second checksum of the preset broadcast service group identifier and extracted data object if the virtual channel table is not a basic virtual channel table; and wherein determining that the VCT is associated with the terminal when the first checksum matches the second checksum comprises:

acquiring a basic virtual channel table and an extended virtual channel table that pass the check from the at least one virtual channel table.

11. The device according to claim 10, wherein the first check operation further comprises:

an extracting sub-operation to extract the data object from the virtual channel table;

a first splicing operation to perform data splicing on the broadcast service group identifier and the extracted data object; and a first check sub-operation to use the spliced data as source data to perform cyclic redundancy check (CRC), wherein a result of the CRC comprises the second checksum.

12. The device according to claim 10, wherein the first check operation further comprises:

an extracting sub-operation to extract the data object from the virtual channel table;

a second check sub-operation to use the extracted data object as the source data to perform checksum computation;

a composite computation sub-operation to use the preset service group identifier and a result of the checksum computation as source data to perform composite computation; and a CRC value acquiring sub-operation to pick out a value of a certain length as the second checksum from a result of the composite computation.

13. The device according to claim 10, wherein the first check operation further comprises:

an extracting sub-operation to extract the data object from the virtual channel table;

a judging sub-operation to judge, according to a reserved field in the virtual channel table, whether the virtual channel table is a basic virtual channel table;

a third check sub-operation to directly acquire a checksum of the basic virtual channel table as the second checksum, when a result from the judging sub-module is that the virtual channel table is a basic virtual channel table;

a fourth check sub-operation to use the preset broadcast service group identifier and the extracted data object to acquire the second checksum of the preset broadcast service group identifier and the extracted data object, when the result of the judging sub-module is that the virtual channel table is not a basic virtual channel table; and the acquiring operation is further operable to acquire a corresponding basic virtual channel table and a corresponding extended virtual channel table that pass the check from the at least one virtual channel table, when the first checksum matches the second checksum.

14. The device according to claim 10, wherein the first check operation further comprises:

a decrypting sub-operation to decrypt the encrypted channel attribute descriptor in the virtual channel table according to the preset broadcast service group identifier and the group key index;

a descriptor extracting sub-operation to extract the valid decrypted channel attribute descriptor; and the acquiring operation is further operable to combine the valid channel attribute descriptor, so as to acquire broadcast channel information that the acquiring module can receive.

15. A device for a broadcast service group, comprising:

a processor; and a non-transitory storage medium that includes instructions code executable by the processor for causing the processor to perform acts of:

receiving, from a terminal, information that uniquely identifies the subscriber device;

determining a broadcast service group identifier associated with the terminal;

communicating, to the terminal, a first message that includes a broadcast service group identifier associated with the terminal;

a second check operation for generating a first check sum based on the broadcast service group identifier and a virtual channel table (VCT) that includes a data object that defines broadcast channel information of different groups;

including the first check sum within the virtual channel table; and communicating, to the terminal, a second message that includes the VCT to the terminal, wherein the terminal is configured to:

communicate information that uniquely identifies the terminal to the device;

receive, from the device, a first message that includes a broadcast service group identifier associated with the terminal;

storing the broadcast service group identifier to a storage device of the terminal;

receive a second message that includes at least one virtual channel table (VCT) that comprises a first checksum and a data object that defines channel information, wherein the device generates the first checksum based on a broadcast service group identifier associated with the VCT and the data object;

generate a second checksum based on the broadcast service group identifier and the data object of the VCT;

compare the first check sum included in the received VCT with the generated second check sum; and determine that that the VCT is associated with the terminal when the first checksum matches the second checksum wherein the second message is received as a separately transmitted message after receiving the first message wherein the virtual channel table comprises a basic virtual channel table and an extended virtual channel table, the basic virtual channel table comprises common broadcast channel information, the extended virtual channel table comprises group broadcast channel information except the common broadcast channel information, and the basic virtual channel table and the extended virtual channel table are identified by using a reserved field; and
wherein in generating the second checksum, the terminal is configured to:
extract the data object from the virtual channel table;
judge, according to the reserved field in the virtual channel table, whether the virtual channel table is a basic virtual channel table, and directly acquiring a checksum of the basic virtual channel table as the second checksum if the virtual channel table is a basic virtual channel table; and
use the preset broadcast service group identifier and extracted data object to acquire the second checksum of the preset broadcast service group identifier and extracted data object if the virtual channel table is not a basic virtual channel table; and
wherein in determining that the VCT is associated with the terminal when the first checksum matches the second checksum the terminal is configured to:
acquire a basic virtual channel table and an extended virtual channel table that pass the check from the at least one virtual channel table.

16. The device according to claim 15, wherein the second check operation further comprises:
a second splicing sub-operation to perform data splicing data on the broadcast service group identifier and the extracted data object; and
a fifth check sub-operation to use the spliced data as source data to perform CRC computation.

17. The device according to claim 15, wherein the second check operation further comprises:
a sixth check sub-operation to use the data object of the virtual channel table as the source data to perform checksum computation;
a composite computation sub-operation to use the preset service group identifier and a result of the checksum computation as source data to perform composite computation; and
a second picking out sub-operation to pick out a value of a certain length as the first checksum from a result of the composite computation.

18. The device according to claim 15, where the instruction code is executable by the processor to the processor to perform:
an identifying operation to use a reserved field in the virtual channel table to identify the basic virtual channel table and the extended virtual channel table, wherein the basic virtual channel table comprises common broadcast channel information, and the extended virtual channel table comprises group broadcast channel information except the common broadcast channel information; and
the second check operation to use the corresponding broadcast service group identifier and the basic virtual channel table to perform the cyclic redundancy check (CRC), and using a result of the CRC as the first checksum; or
use the corresponding broadcast service group identifier and the extended virtual channel table to perform the CRC, and use a result of the CRC as the first checksum.

19. The device according to claim 15, wherein the second check operation further comprises:
a grouping and encrypting sub-operation to group channel attribute descriptors according to a preset rule, and encrypt each group of channel attribute descriptors with a corresponding key; and
a checksum adding sub-operation to combine the encrypted channel attribute descriptors as the first checksum to add the first checksum into the virtual channel table.

* * * * *